United States Patent
Henri

(10) Patent No.: US 6,643,271 B1
(45) Date of Patent: Nov. 4, 2003

(54) ADJUSTABLE GAIN TRANSMIT CANCELLATION IN A FULL-DUPLEX MODEM DATA ACCESS ARRANGEMENT (DAA)

(75) Inventor: James B. Henri, Grayslake, IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/303,320

(22) Filed: Apr. 30, 1999

(51) Int. Cl.[7] ............................. H04B 3/12; H04M 9/08
(52) U.S. Cl. ................................. 370/286; 379/406.01
(58) Field of Search ......................... 370/286, 288, 370/289, 290; 379/406.01, 406.04, 406.05, 406.06, 406.07

(56) References Cited

U.S. PATENT DOCUMENTS

| | | | |
|---|---|---|---|
| 4,055,729 A | 10/1977 | Vandling | 179/2 |
| 4,056,719 A | 11/1977 | Waaben | 250/199 |
| 4,144,417 A * | 3/1979 | Oshima et al. | 379/406.06 |
| 4,282,604 A | 8/1981 | Jefferson | 250/199 |
| 4,531,220 A * | 7/1985 | Brie et al. | 370/286 |
| 4,796,296 A * | 1/1989 | Amada et al. | 379/406.06 |
| 5,003,579 A | 3/1991 | Jones | 379/93 |
| 5,062,102 A * | 10/1991 | Taguchi | 370/291 |
| 5,117,418 A | 5/1992 | Chaffee et al. | 370/32.1 |
| 5,121,414 A | 6/1992 | Levine et al. | 375/96 |
| 5,148,427 A * | 9/1992 | Buttle et al. | 370/291 |
| 5,166,924 A | 11/1992 | Moose | 370/32.1 |
| 5,195,106 A | 3/1993 | Kazechi et al. | 375/12 |
| 5,245,654 A | 9/1993 | Wilkison et al. | 379/399 |
| 5,313,498 A * | 5/1994 | Sano | 370/286 |
| 5,317,596 A | 5/1994 | Ho et al. | 375/14 |
| 5,319,674 A | 6/1994 | Cherubini | 375/14 |
| 5,481,606 A | 1/1996 | Andrieu et al. | 379/399 |
| 5,504,778 A * | 4/1996 | Carriere | 370/288 |
| 5,519,727 A | 5/1996 | Okanoue et al. | 375/232 |
| 5,521,908 A | 5/1996 | Younce et al. | 370/32.1 |
| 5,528,686 A | 6/1996 | Cwynar et al. | 379/405 |
| 5,644,635 A * | 7/1997 | Armbruster | 370/286 |
| 5,673,290 A | 9/1997 | Cioffi | 375/260 |
| 5,696,819 A * | 12/1997 | Suizu et al. | 370/286 |
| 5,717,752 A | 2/1998 | Whitney | 379/399 |
| 5,946,393 A | 8/1999 | Holcombe | 379/399 |

OTHER PUBLICATIONS

John Bellamy, "Digital Modulation And Radio Systems", Digital Telephony second edition, 1991, pp. 279–333.

Richard Williams, "A Digital Modem And Analogue Modem Pair For Use On The Public Switched Telephone Network (PSTN) At Data Signaling Rates Of Up To 5600bit/s Downstream And Up To 33600bit/s Upstream", ITU Recommendation V.90, May 6, 1998, pp. 1–50.

* cited by examiner

Primary Examiner—Melvin Marcelo
Assistant Examiner—Nhat Do
(74) Attorney, Agent, or Firm—McDonnell Boehnen Hulbert & Berghoff

(57) ABSTRACT

An improved data access arrangement device for use in full-duplex two-wire communication systems having a transmission impedance characteristic. The DAA includes a transmit amplifier and a receive amplifier adapted for connection to a two-wire line, a codec connected to the transmit amplifier for generating a transmit signal, a summation device connected to the receive amplifier, an echo cancellation path including a variable gain amplifier, where the path extends between the codec and the summation device, and wherein the variable gain amplifier is adjusted in accordance with the transmission impedance characteristic. The variable gain amplifier may include a gain register that is programmed by a microprocessor, or may have the gain set by user-configurable switches. The summation device is preferably an operational amplifier.

6 Claims, 2 Drawing Sheets

ADJUSTABLE GAIN TRANSMIT CANCELLATION IN A FULL-DUPLEX MODEM DATA ACCESS ARRANGEMENT (DAA)

FIELD OF INVENTION

The present invention relates to telecommunications networks. More specifically, it relates to echo cancellation devices used in two-wire line full duplex communication systems, and more particularly to two-wire line modem devices.

BACKGROUND OF THE INVENTION

Past implementations of hybrids used to accomplish four-wire to two-wire conversion employ a transmission signal cancellation path to duplicate and cancel the portion of the outgoing transmission signal that is erroneously picked up by the receive amplifier. A hybrid used in a typical solid-state Data Access Arrangement (DAA) device will employ a gain stage that serves as the transmission signal cancellation path.

Telephone lines present a wide range of characteristic impedances. The characteristic impedance varies with frequency on a particular telephone line, and each two-wire subscriber line, or telephone line, will present a different characteristic.

Hybrids in present DAA devices use a fixed gain stage for cancellation that is not responsive to changes in the telephone line impedance. Such a fixed gain stage does not provide frequency dependent impedance matching. The DAA is designed to perform a coarse echo cancellation by providing a hybrid that is not precisely balanced. The prior art DAA devices do not provide for the connection of external impedance matching devices.

In view of recent telecommunication techniques that utilize a larger portion of the available bandwidth such as that specified by ITU-T recommendation V.90, it would be advantageous to provide a transmission signal cancellation path in a DAA device that is more flexible and responsive to varying telephone line conditions, and which is able to better model the telephone line impedance to provide better echo cancellation, especially at the band edges.

SUMMARY OF THE INVENTION

In accordance with preferred embodiments of the present invention, an improved data access arrangement is provided. The DAA provides an external pin for connecting an impedance matching circuit, and includes a variable gain stage to accommodate a variety of line impedance characterisitics. An improved data access arrangement device for use in full-duplex two-wire communication systems having a transmission impedance characteristic. The DAA includes a transmit amplifier and a receive amplifier adapted for connection to a two-wire line, a codec connected to the transmit amplifier for generating a transmit signal, a summation device connected to the receive amplifier, an echo cancellation path including a variable gain amplifier, where the path extends between the codec and the summation device, and wherein the variable gain amplifier is adjusted in accordance with the transmission impedance characteristic. The variable gain amplifier may include a gain register that is programmed by a microprocessor, or may have the gain set by user-configurable switches. The echo cancellation path also may include a frequency dependent impedance circuit, and more specifically, a bandpass filter. The impedance circuit may also be an active filter element, such as an operational amplifier. The filter is preferably external to the DAA integrated circuit so as to allow flexibility in the choice of filter parameters. The summation device is preferably an operational amplifier.

The foregoing and other features and advantages of a preferred embodiment of the present invention will be more readily apparent from the following detailed description, which proceeds with references to the accompanying drawings.

BRIEF DESCRIPTION OF THE DRAWINGS

Preferred embodiments of the present invention are described with reference to the following drawings, wherein.

DETAILED DESCRIPTION OF PREFERRED EMBODIMENTS

Figure 1:
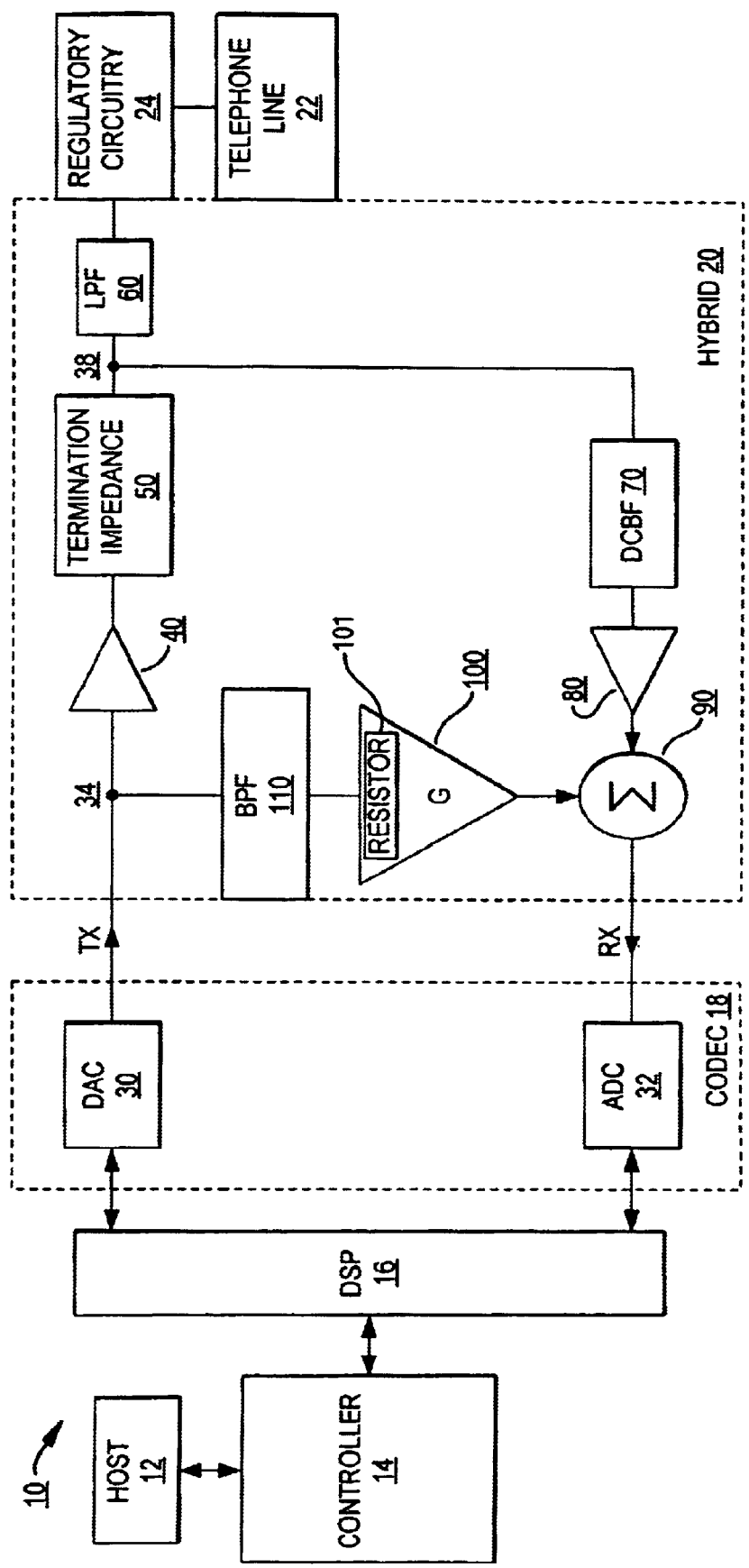
FIG. 1 is a block diagram illustrating a preferred embodiment of the improved hybrid.

FIG. 1 is a block diagram illustrating an exemplary DAA and hybrid conversion system 10, including a Host 12, a Controller 14, a Digital Signal Processor (DSP) 16, a Codec 18, and a Hybrid 20 interfacing to a telephone line 22 via Regulatory Circuitry 24. The Host 12 transmits data to and receives data from the DSP 16 via the Controller 14. The Codec 18 includes a Digital to Analog Converter (DAC) 30 used to convert digital samples, transmitted by the Host 12 and processed by the DSP 16, to an analog transmission signal (TX) for transmission to the telephone line 22 via the Hybrid 20. The Codec 18 further includes an Analog to Digital Converter (ADC) 32 used to convert an analog receive signal (RX), received from the telephone line 22 via the Hybrid 20, to digital samples to be processed by the DSP 16. The DSP 16 is also used to set the gain level of the codec 18 by controlling the contents of registers within the codec. The registers then determine the amplifier gain using techniques well known in the art.

The Hybrid 20 includes a Transmit Amplifier 40, a Termination Impedance 50, a Low Pass Filter (LPF) 60, a DC Blocking Filter (DCBF) 70, a Receive Amplifier 80, a Summer 90, a variable Gain Stage 100, and a Band Pass Filter (BPF) 110. The Hybrid 20 receives the analog transmission signal TX at node 34 from the DAC 30. The transmission signal TX at node 34 is routed along a cancellation path and a transmission path to the telephone line 22. The transmission signal along the transmission path is amplified by Transmit Amplifier 40 and passes through a Termination Impedance 50. Preferably, the Termination Impedance 50 is preferably chosen to "match" the expected value of the characteristic line impedance (not shown) of the telephone line 22. The transmission signal faces a "voltage divider" of sorts in the Termination Impedance 50 and the telephone line 22 impedance.

The outgoing transmission signal is filtered by the LPF 60 and is passed out of the Hybrid 20 to the telephone line 22 via the Regulatory Circuitry 24. As is known by those of skill in the art, the Regulatory Circuitry 24 will typically include diode bridge rectifier circuit, ferrite beads, sidactor, and capacitor arrangements to provide isolation and overvoltage protection.

Conversely, the Hybrid 20 of FIG. 1 receives the incoming signal from the telephone line 22 via the Regulatory Circuitry 24. A portion of the outgoing transmission signal is undesirably fed back along the receive path, forming and echo signal, and combines with the receive signal that comes from the LPF 60. The echo signal, which is that portion of the outgoing transmission signal that is fed back, will vary in accordance with the voltage divided formed by the termination impedance 50 and the line impedance (not shown) of the telephone line 22. The line characterisitics that shape the echo signal is generally referred to as the echo path or echo channel. The echo channel includes effects of the line impedance and the low pass filter 60. The desired receive signal from the distant end together with the undesired echo pass through the DCBF 70 and next are amplified by the Receive Amplifier 80.

As noted above, the analog transmission signal TX as received by the Hybrid 20 is directed at node 34 along the cancellation path and the transmission path to the telephone line 22. The transmission signal cancellation path provides an echo cancellation signal at the Summer 90 in order to cancel the contribution to the receive signal that is due to the undesired feedback portion of the outgoing transmission signal. In the exemplary preferred embodiment shown in FIG. 1, The BPF 110 is cascaded with the variable Gain Stage 100 to form the transmission signal cancellation path. Preferably, the echo cancellation signal is shaped by BPF 110 and the Gain Stage 100 having gain G. The echo cancellation path also may include another type of frequency dependent impedance circuit such as a multiple pole-zero filter with the poles and zeros located at the desired frequencies. The impedance circuit may also include active filter elements, such as operational amplifiers. The filter is preferably external to the DAA integrated circuit so as to allow flexibility in the choice of filter parameters and circuit components.

Preferably, the value of the gain G is capable of being varied or changed and is not fixed. In certain preferred embodiments of the invention, the value of the feed back gain G is varied according to telephone line 22 conditions. The characteristic impedance of subscriber lines varies from country to country, thus a variable gain G allows the DAA to adapt its echo cancellation for the given environment. The range of gains may be set from −0.3 to −0.9, and more preferably, is set to one of four values: −0.50, −0.55, −0.60 or −0.65. It should be understood that in alternative embodiments of the DAA the feed back gain G can be fixed and non-variable. A typical fixed value for the gain G is −0.5, or −0.8. The gain may be set by a number of available techniques well known to designers in the electrical arts. For example, the gain may be set by user-controlled switches, such as DIP switches. The user, having knowledge of the typical line impedance in his telephone system, may refer to a chart and set the switches accordingly. Alternatively, the gain may be set by the user through software in a similar manner, resulting in the DSP setting amplifier gain registers, in a manner similar to the gain registers used in standard codec devices. The gain setting may also be done automatically by performing voltage measurements of a test signal passed through the DAA. As stated above, the DAA impedances together with the line impedance for a voltage divider. Hence, the line impedance may be determined by measuring a test signal placed on the line by the DAA. The DSP can then set the gain switches or registers as required.

Preferably, as described above, the Gain Stage 100 operates in conjunction with the BPF 110 to form the transmission signal cancellation path. In a preferred embodiment, the feed back gain G is −0.6. It should be understood that numerous implementations of the transmission signal cancellation path are contemplated within this disclosure including a Gain Stage 100 with a fixed feed back gain G cascaded with a BPF 110; a Gain Stage 100 with a variable feed back gain G cascaded with a BPF 110; a Gain Stage 100 with a variable feed back gain G with no cascaded filter; etc.

Figure 2:
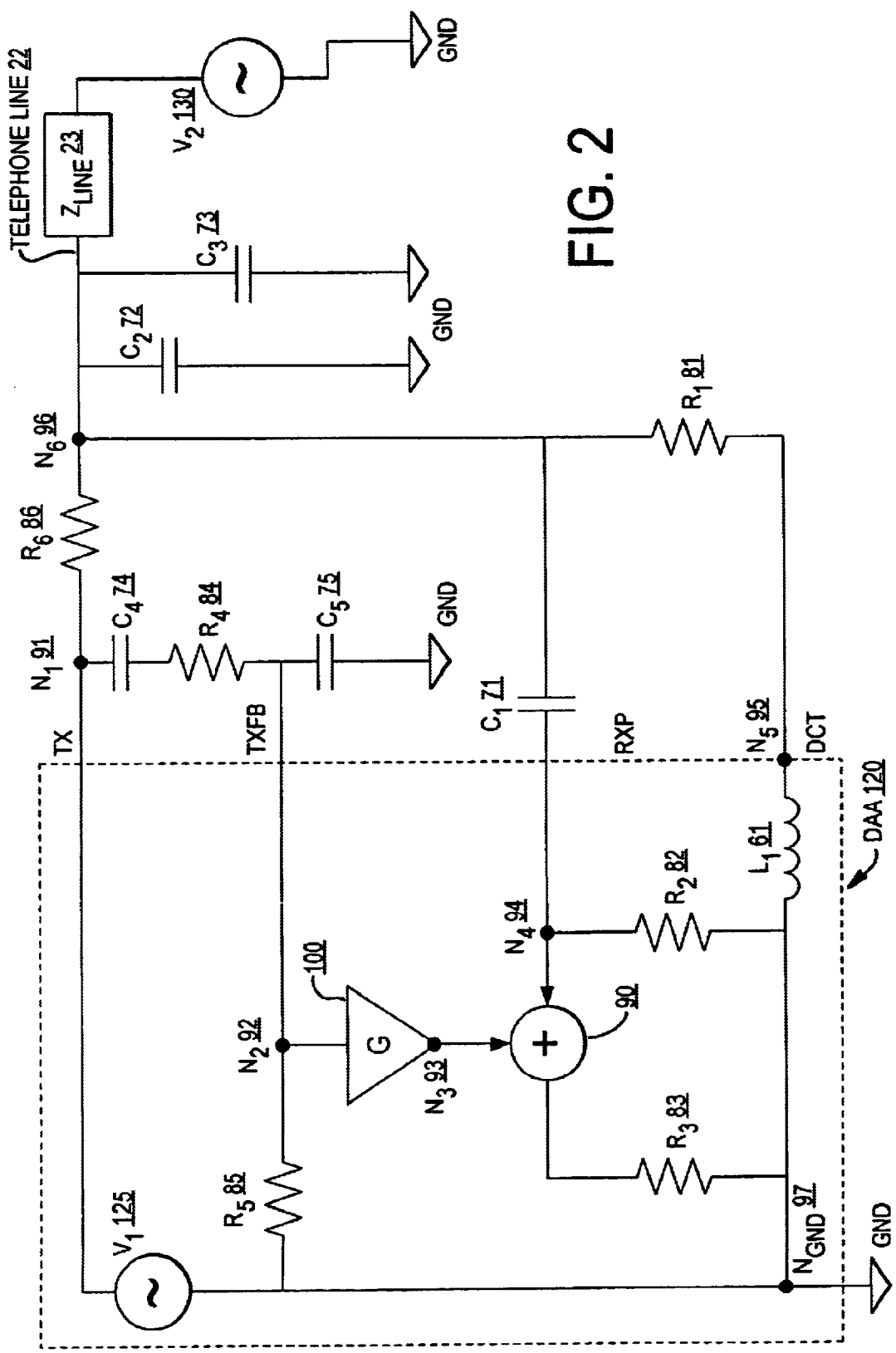
FIG. 2 is a circuit level diagram illustrating a preferred embodiment of the hybrid of FIG. 1.

Finally, after the combined received and transmission reflection signal is amplified by the Receive Amplifier 80, the signal is summed at the Summer 90 with the transmission signal TX that has been filtered by the BPF 110 and multiplied by the feed back gain G of Gain Stage 100, to yield the analog receive signal RX. The Gain Stage 100 with feed back gain G of FIG. 1 spans from node $N_2$ to node $N_3$, as shown in FIG. 2. The gain stage is preferably implemented as an operational amplifier. To adjust the gain, a programmable register 101 is used to switch in different gain settings. The transmission cancellation path of FIG. 1 terminates in the Summer 90. Summer 90 is also preferably implemented as an operational amplifier having the inputs summed prior to amplification.

An exemplary embodiment of the present invention is presented in FIG. 2. FIG. 2 is a circuit diagram illustrating a preferred implementation of the Hybrid 20 of FIG. 1. The functional blocks of FIG. 1 are represented by components in FIG. 2.

An exemplary Data Access Arrangement (DAA) integrated circuit chip 120 is represented in FIG. 2 by dotted lines. The DAA chip 120 includes four pins TX (transmission signal input at node $N_1$) 91, TXFB (transmission signal feed back at node $N_2$) 92, RXP (receive channel input from telephone line at node $N_4$) 94, DCT (DC termination at node $N_5$) 95, as well as a pin connected to signal ground (GND) at node $N_{GND}$ 97. The DAA 120 includes codec 18 (not shown) within a single integrated circuit package. The TXFB pin allows for the connection of an external impedance circuit, specifically, a bandpass filter in the example of the preferred embodiment. Prior art devices do not provide external access to the feedback path, and hence are not flexible in their approach to echo cancellation.

The transmit data enters the DAA 120 by way of a digital data bus. The Codec 18 transforms the digital data to an analog signal, which is shown as voltage source $V_1$ 125. The transmit signal leaves the DAA 120 at pin TX of the DAA chip 120. The resistor $R_3$ 83 is shown to model the input resistance of the codec, and is equivalent to 100 MΩ. The resistor $R_5$ 85 is used to model the input resistance to the variable gain amplifier, and is preferably equal to 70 kΩ.

After amplification by the Transmit Amplifier 40 of FIG. 1, the transmission signal passes through the Termination Impedance 50. The Termination Impedance 50 of FIG. 1 spans from node $N_1$ 91 to node $N_6$ 96 in FIG. 2 and includes resistor $R_6$ 86. Preferably, the resistor $R_6$ is chosen to match the characteristic impedance of the telephone line. In a preferred embodiment of the present invention, the resistor $R_6$ is equivalent to 600 Ω. The Low Pass Filter (LPF) 60 of FIG. 1 is connected at node $N_6$ 96 in FIG. 2 and includes capacitor $C_2$ 72. In a preferred embodiment, capacitor $C_2$ 72 is equivalent to 0.033 µF. Capacitor $C_3$ 73 provides filtering of high frequency noise components. The DCBF 70 of FIG. 1 spans from node $N_6$ 96 to node $N_4$ 94 in FIG. 2 and includes capacitor $C_1$ 71. Preferably capacitor $C_1$ 71 is equivalent to 1 µF. Inductor L1 61 is a gyrator that provides the necessary current voltage characteristic of the transmission line. It may be implemented with operational amplifiers and capacitive elements (not shown). Resistor $R_2$ 82 represents the input impedance of the summer 90 and is equivalent to 70 kΩ. Resistor $R_1$ 81 is an external power resistor that provides a resistive component of the DC termination.

The telephone line 22, shown in FIGS. 1 and 2, has an associated characteristic line impedance. This line impedance is modeled in FIG. 2 as $Z_{LINE}$ 23. As is known to those in the art, the line impedance associated with a telephone line can vary as a function of frequency and the size and geometry of the line. It should be understood that although the line impedance $Z_{LINE}$ 23 can be represented by a resistor of 600Ω, this representation may serve as an estimate so that attempts can be made to match the load of the telephone line.

As described above, the transmission cancellation path preferably includes the Band Pass Filter (BPF) 110 and the Gain Stage 100 with feed back gain G. The Band Pass Filter (BPF) 110 of FIG. 1 spans from node $N_1$ 91 to node $N_2$ 92 in FIG. 2 and includes capacitors $C_4$ 74 and $C_5$ 75 and resistor $R_4$ 84. In a preferred embodiment, the capacitors $C_4$ 74 and $C_5$ 75 are equivalent to 0.12 µF and 0.018 µF, respectively, while the resistor $R_4$ 84 is equivalent to 649 Ω. The BPF 110 serves to shape the echo cancellation signal to conform more closely to the frequency characteristics of the echo channel. This is done in part to counteract the effects of the low pass filter 60 and the DCBF 70 within the echo path. Without the BPF 110, the echo would have incomplete cancellation, particularly near the band edges.

An operating environment for the improved DAA disclosed herein includes a processing system with at least one high speed Central Processing Unit ("CPU"), such as the DSP 16 and the host 12, and a memory system. In accordance with the practices of persons skilled in the art of computer programming, the DAA is described with reference to acts and symbolic representations of operations or instructions that are performed by the processing system, unless indicated otherwise. Such acts and operations or instructions are sometimes referred to as being "computer-executed", or "CPU executed."

It will be appreciated that the acts and symbolically represented operations or instructions include the manipulation of electrical signals by the CPU. An electrical system with data bits causes a resulting transformation or reduction of the electrical signal representation, and the maintenance of data bits at memory locations in the memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic disks, and any other volatile or non-volatile mass storage system readable by the CPU. The computer readable medium includes cooperating or interconnected computer readable media, which exist exclusively on the processing system or is distributed among multiple interconnected processing systems that may be local or remote to the processing system.

It should be understood that the programs, processes, methods, systems and apparatus described herein are not related or limited to any particular type of computer apparatus (hardware or software), unless indicated otherwise. Various types of general purpose or specialized computer apparatus may be used with or perform operations in accordance with the teachings described herein.

In view of the wide variety of embodiments to which the principles of the invention can be applied, it should be understood that the illustrated embodiments are exemplary only, and should not be taken as limiting the scope of the present invention. For example, the Steps of the flow diagrams may be taken in sequences other than those described, and more or fewer elements or components may be used in the block diagrams. In addition, the present invention can be practiced with software, hardware, or a combination thereof.

The claims should not be read as limited to the described order of elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

I claim:

1. An improved data access arrangement device for use in full-duplex two-wire communication systems having a frequency dependent transmission impedance characteristic, comprising:

a transmit amplifier and a receive amplifier adapted for connection to a two-wire line;

a codec directly connected to said transmit amplifier for generating a transmit signal;

a summation device connected to said receive amplifier;

an echo cancellation path including a variable gain amplifier, said path extending between said codec and said summation device, wherein said variable gain amplifier is adjusted in accordance with the frequency of the transmission impedance characteristic.

2. The device of claim 1 wherein said variable gain amplifier includes a gain register.

3. The device of claim 2 wherein said gain register is programmed by a microprocessor.

4. The device of claim 1 wherein said variable gain amplifier is set by user-configurable switches.

5. The device of claim 1 wherein said summation device is an operational amplifier.

6. The device of claim 1 wherein the DAA further comprises an external pin for connecting an external impedance circuit to the cancellation signal path.

* * * * *